(12) United States Patent
Yoon et al.

(10) Patent No.: US 9,343,723 B2
(45) Date of Patent: May 17, 2016

(54) BATTERY PACK AND BATTERY MODULE COMPRISING THE SAME

(75) Inventors: Jong-Wook Yoon, Yongin-si (KR);
Eun-Ok Kwak, Yongin-si (KR);
Byoung-Ju Kim, Yongin-si (KR);
Jeong-Deok Byun, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1141 days.

(21) Appl. No.: 13/353,761

(22) Filed: Jan. 19, 2012

(65) Prior Publication Data

US 2013/0045401 A1    Feb. 21, 2013

(30) Foreign Application Priority Data

Aug. 17, 2011   (KR) .................. 10-2011-0081811

(51) Int. Cl.
| | |
|---|---|
| *H01M 2/06* | (2006.01) |
| *H01M 2/20* | (2006.01) |
| *H01M 2/30* | (2006.01) |
| *H01M 10/48* | (2006.01) |
| *B60L 11/18* | (2006.01) |
| *H01M 10/44* | (2006.01) |

(52) U.S. Cl.
CPC ............. *H01M 2/206* (2013.01); *B60L 11/187* (2013.01); *B60L 11/1879* (2013.01); *H01M 2/30* (2013.01); *H01M 10/482* (2013.01); *B60L 2240/545* (2013.01); *H01M 10/441* (2013.01); *Y02T 10/705* (2013.01); *Y02T 10/7005* (2013.01)

(58) Field of Classification Search
CPC ........................................................ H01M 4/00
See application file for complete search history.

(56) References Cited

U.S. PATENT DOCUMENTS

| | | | |
|---|---|---|---|
| 2006/0162149 | A1 | 7/2006 | Ha et al. |
| 2010/0062329 | A1 | 3/2010 | Muis |
| 2010/0216009 | A1* | 8/2010 | Kim .............................. 429/160 |
| 2010/0301807 | A1 | 12/2010 | Gamboa et al. |
| 2010/0309949 | A1* | 12/2010 | Akaboshi et al. ............... 374/45 |
| 2011/0123838 | A1 | 5/2011 | Lee et al. |
| 2011/0195285 | A1 | 8/2011 | Shin et al. |
| 2012/0088135 | A1 | 4/2012 | Kim et al. |

FOREIGN PATENT DOCUMENTS

| | | |
|---|---|---|
| JP | 2010-015906 A | 1/2010 |
| KR | 10-0928975 B | 11/2009 |

* cited by examiner

*Primary Examiner* — Jacob Marks
(74) *Attorney, Agent, or Firm* — Robert E. Bushnell, Esq.

(57) ABSTRACT

A battery pack having a battery cell and a case accommodating the battery cell and including a terminal portion that is electrically connected to the battery cell. The terminal portion includes a first groove portion for attaching a temperature sensor for obtaining temperature information of the battery cell.

20 Claims, 7 Drawing Sheets

BATTERY PACK AND BATTERY MODULE COMPRISING THE SAME

CLAIM OF PRIORITY

This application makes reference to, incorporates the same herein, and claims all benefits accruing under 35 U.S.C. §119 from an application for BATTERY PACK AND BATTERY MODULE COMPRISING THE SAME earlier filed in the Korean Intellectual Property Office on 17 Aug. 2011 and there duly assigned Serial No. 10-2011-0081811.

BACKGROUND OF THE INVENTION

1. Field of the invention

The present invention generally relates to battery packs and battery modules comprising the battery packs.

2. Description of the Related Art

Secondary batteries are used in various industry fields. For example, secondary batteries are widely used as an energy source of mobile electronic devices such as digital cameras, cellular phones, and laptop computers. Moreover, the secondary batteries are regarded as an energy source for hybrid electric vehicles which are suggested as a solution to air pollution caused by internal combustion engines which use fossil fuels such as gasoline or diesel.

The secondary batteries may be packaged, and may be supplied in the form of battery packs or battery modules in which a plurality of battery packs are modularized.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include battery packs whereby accurate temperature information may be obtained, wherein the battery packs may be easily connected to a temperature sensor and batteries of the battery packs may be easily electrically connected to one another.

One or more embodiments of the present invention include battery modules comprising the battery packs.

Additional aspects will be set forth in part in the description which follows and, in part, will be apparent from the description, or may be learned by practice of the presented embodiments.

According to one or more embodiments of the present invention, a battery pack includes: a battery cell; and a case accommodating the battery cell and comprising a terminal portion that is electrically connected to the battery cell, wherein the terminal portion comprises a first groove portion for attaching a temperature sensor for obtaining temperature information of the battery cell and a second groove portion for coupling a bus bar.

The temperature sensor may be coupled to the first groove portion via a bolt.

The temperature sensor may comprise a ring terminal, and the temperature sensor and the first groove portion may be coupled to each other by a bolt that passes through the ring terminal to be coupled to the first groove portion using a screw.

A screw thread corresponding to the bolt may be formed in an inner surface of the first groove portion.

The first groove portion may comprise an embedding space in which the temperature sensor is embedded.

A screw thread for bolt coupling may be formed in an inner surface of the second groove portion.

The first groove portion may be formed on at least one of two sides of the terminal portion with respect to the second groove portion.

The terminal portion may comprise: a body portion contacting lead tabs extended from the battery cell; and a protrusion that is vertically extended from a side of the body portion with respect to the body portion and that comprises the first groove portion.

According to one or more embodiments of the present invention, a battery module includes a plurality of battery packs stacked in a thickness direction, wherein each of the battery packs comprises: a battery cell comprising a lead tab extended in one direction; a case accommodating the battery cell and comprising a terminal portion that is electrically connected to the lead tab; and a plurality of bus bars that electrically connect the battery packs, wherein a first groove portion for attaching a temperature sensor for obtaining temperature information of the battery cell and a second groove portion for coupling a bus bar are formed on an outer portion of the terminal portion.

The temperature sensor may comprise a ring terminal, wherein the temperature sensor is disposed on the terminal portion via a bolt that passes through the ring terminal to be coupled to the first groove portion.

The first groove portion may comprise an embedding space in which the temperature sensor is to be embedded.

The embedding space may be formed at a depth equal to or higher than a height of the temperature sensor.

The terminal portion may comprise: a body portion contacting the lead tabs; and a protrusion portion that is vertically extended from a side of the body portion with respect to the body portion and comprises the first groove portion formed on a outer surface of the protrusion.

The first groove portion may be formed on at least one of two sides of the protrusion with respect to the bus bar.

At least some of the bus bars may further comprise a balancing cable for obtaining state information of the battery packs for voltage balancing of the battery module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
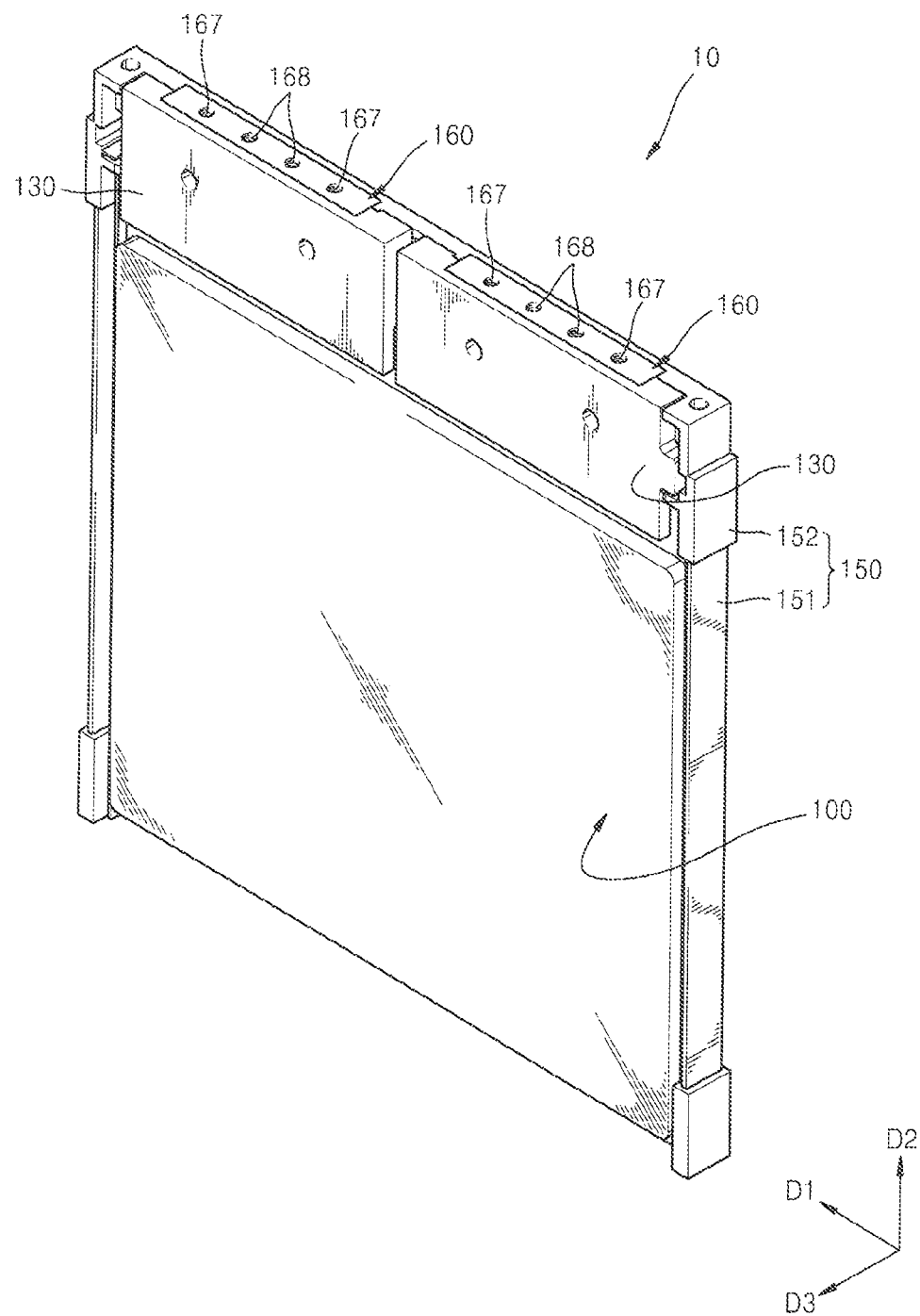
FIG. 1 is a schematic perspective view illustrating a battery pack according to an embodiment of the present invention.

The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
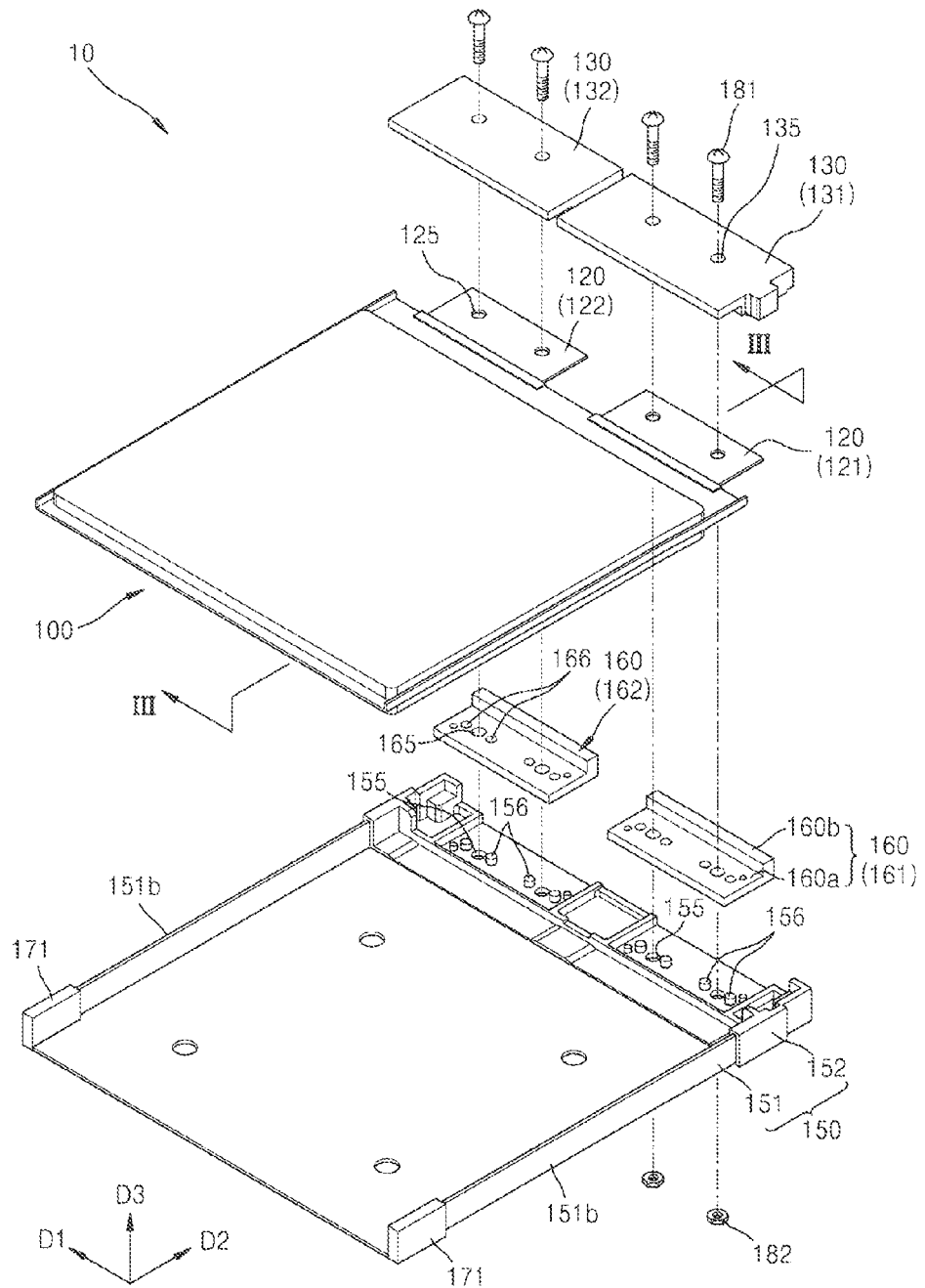
FIG. 2 is an exploded perspective view of the battery pack of FIG. 1.
Figure 3:
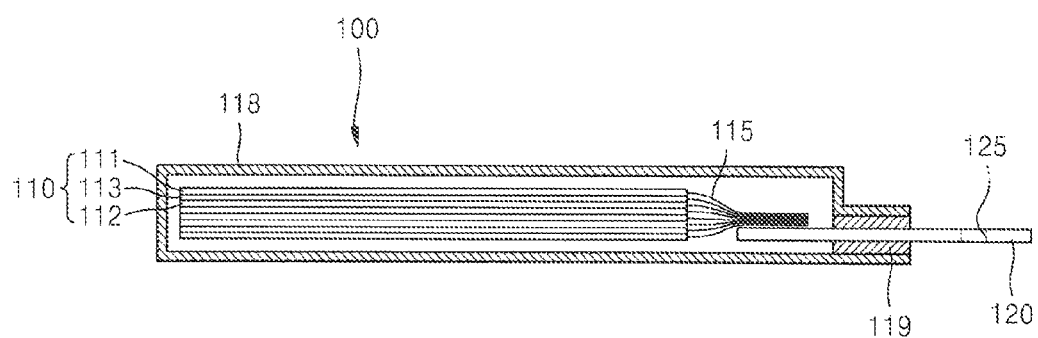
FIG. 3 is a schematic cross-sectional view illustrating a battery cell according to an embodiment of the present invention.

FIG. 1 is a schematic perspective view illustrating a battery pack 10 according to an embodiment of the present invention. FIG. 2 is an exploded perspective view of the battery pack 10 of FIG. 1. FIG. 3 is a schematic cross-sectional view illustrating a battery cell 100 according to an embodiment of the present invention.

Referring to FIGS. 1 and 2, the battery pack 10 may include a battery cell 100 and a case 150 accommodating the battery cell 100.

The battery cell 100 is a rechargeable secondary battery, which is, for example, a lithium-ion battery. The battery cell 100 may include a lead tab 120 extended from the battery cell 100 and disposed at a side of the battery cell 100.

Referring to FIG. 3, the battery cell 100 may include an electrode assembly 110 formed by sequentially overlapping a positive electrode plate 111, a separator 113, and a negative electrode plate 112. To ensure the battery pack 10 has high output and high capacity, a plurality of positive electrode plates 111, a plurality of separators 113, and a plurality of negative electrode plates 112 may be stacked. The electrode assembly 110 may be encapsulated in a pouch 118.

Although not shown in FIG. 3, the positive electrode plates 111 may be formed by coating a positive active material on a surface of a positive electrode collector, and the negative electrode plates 112 may be formed by coating a negative active material on a surface of a negative electrode collector.

A plurality of electrode tabs 115 may be respectively electrically connected to the positive electrode plates 111 and the negative electrode plates 112. The electrode tabs 115 extending from the positive electrode plates 111 may overlap one another, and the electrode tabs 115 extending from the negative electrode plates 112 may overlap one another; and the electrode tabs 115 may be tightly bound to one another and electrically connected to the lead tab 120. For example, the electrode tabs 115 and the lead tab 120 may be coupled to each other using a method such as ultrasonic fusion.

The lead tab 120 forms an interconnection with the outside of the battery cell 100, and may extend from the side of the battery cell 100 so as to induce a current to the outside from the battery cell 100. For example, a portion of the lead tab 120 may be exposed to the outside of the pouch 118, and an insulation member 119 may be interposed between the lead tab 120 and the pouch 118 to provide insulation. The lead tab 120 may include a first lead tab 121 and a second lead tab 122 having different polarities. The first lead tab 121 may be electrically connected to the positive electrode plates 111 of the electrode assembly 110, and the second lead tab 122 may be electrically connected to the negative electrode plates 112 of the electrode assembly 110.

Referring to FIGS. 1 and 2, again, a coupling hole 125 may be formed in the lead tab 120 for electrical connection with a terminal portion 160. The coupling hole 125 may be formed in a portion of the lead tab 120 spaced apart from an edge of the lead tab 120 by a predetermined distance. For example, the coupling hole 125 may be formed in pairs at positions spaced apart from two edges of the lead tab 120.

The lead tab 120 may be formed of a metal having good conducting properties. For example, the metal may be nickel or copper or alloys thereof. The first lead tab 121 and the second lead tab 122 may include different materials. For example, the first lead tab 121 may include nickel, and the second lead tab 122 may include copper.

The battery cell 100 may be electrically connected to an external load (not shown) or to an external power supply device (not shown) via the lead tab 120. For example, the battery cell may output a discharging current to an external load via the lead tab 120, or the battery cell 100 may receive a charging current from an external power supply device via the lead tab 120.

The battery cell 100 may be assembled on the case 150 and may be supported by the case 150. An adhesive member (not shown) such as an insulation tape may be interposed between the battery cell 100 and the case 150, thereby fixing a position of the battery cell 100.

The case 150 may include a first supporting portion 151 accommodating and supporting the battery cell 100 and a second supporting portion 152 accommodating and supporting the lead tab 120 extending from the battery cell 100. The case 150 may protect the battery cell 100 from an external impact and function as a heat dissipation plate that dissipates an operational heat which accompanies a charging/discharging operation of the battery cell 100, to the outside.

The first supporting portion 151 may include a metal having mechanical rigidity and good thermal conductivity. For example, the first supporting portion 151 may include aluminum or an alloy thereof. For example, the first supporting portion 151 may include aluminum or alloy thereof, and a surface of the first supporting portion 151 may include an insulating layer formed by oxidizing process such as an anodizing. Accordingly, the first supporting portion 151 may facilitate heat dissipation while contacting with the battery cell 100, and may maintain electrical insulation from the battery cell 100.

The first supporting portion 151 may have an overall flat plate shape, and may include a rib 151 that is formed by bending each side end of the first supporting portion 151. A spacer 171 may be disposed on the ribs 151$b$. The spacer 171 may guarantee a predetermined space between adjacent battery packs 10 in a stack direction in a battery module in which a plurality of battery packs 10 may be electrically coupled to one another, even though each of the battery packs 10 is counted as a single assembly unit.

The second supporting portion 152 accommodates the lead tab 120 extending from the battery cell 100. The second supporting portion 152 may accommodate the lead tab 120 while including a terminal portion 160, and the lead tab 120 may be mounted on the terminal portion 160. For example, coupling members 181 and 182 may pass through the lead tab 120 and the terminal portion 160 to be coupled to the second supporting portion 152 so that the lead tab 120, the terminal portion 160, and the second supporting portion 152 may be coupled to one another. To this end, a coupling hole 155 coupling the coupling members 181 and 182 may be formed in the second supporting portion 152; the coupling hole 155 may be formed at a position corresponding to the coupling hole 125 of the lead tab 120 and a coupling hole 165 of the terminal portion 160.

The second supporting portion 152 may include an insulating material in order to insulate the terminal portion 160 from external environments and to prevent an electric short circuit. The second supporting portion 152 may include a polymer resin material such as Poly-Phenylene Sulfide (PPS).

The terminal portion 160 may be assembled on the second supporting portion 152. For example, fixing holes 166 may be formed in the terminal portion 160 to couple the second supporting portion 152. The fixing protrusions 156 protruding from the second supporting portion 152 may be inserted into the fixing holes 166 so as to integrate the terminal portion 160 with the second supporting portion 152. According to another embodiment of the present invention, when forming the second supporting portion 152 by injection molding, the terminal portion 160 may be disposed together in an injection molding frame (not shown) and a raw material paste may be injected into the frame so that the second supporting portion 152 is integrated with the terminal portion 160 as the raw material paste hardens.

The terminal portion 160 may be electrically connected with the lead tab 120, and relays a charging/discharging current between the outside and inside of the battery pack 10. The first terminal portion 161 may be electrically connected with the first lead tab 121, and the second terminal portion 162 may be electrically connected with the second lead tab 122.

The terminal portion 160 may include a body portion 160$a$ that contacts the lead tab 120 and a protrusion 160$b$ that is integrally formed with the body portion 160$a$. The protrusion 160$b$ may be protruded vertically with respect to the body portion 160$a$ so as to have approximately an "L" shape.

The body portion 160$a$ may be in surface contact with the lead tab 120 by being overlapped with the lead tab 120. For example, a first surface of the lead tab 120 may be in surface contact with the body portion 160$a$, and the lead tab 120 is constricted with respect to the terminal portion 160 according to coupling force of the coupling members 181 and 182 so that the lead tab 120 and the terminal portion 160 contact each other closely. Here, a holder case 130 may be disposed on a second surface of the lead tab 120. Specifically, a first holding case 131 may be disposed on a second surface of the first lead tab 121 and a second holding case 132 may be disposed on a second surface of the second lead tab 122. The coupling members 181 and 182 may continuously pass through coupling holes 135 and the coupling holes 125, 165, and 155 of the holder case 130; the lead tab 120, the body portion 160$a$, and the second supporting portion 152, thereby coupling the holder case 130, the lead tab 120, the body portion 160$a$, and the second supporting portion 152 to one another.

The terminal portion 160, that is, the body portion 160$a$ of the terminal portion 160 and the lead tab 120 may be closely adhered to each other in surface contact, and the terminal portion 160 may be manufactured to have a predetermined thickness, and thus heat generated in the lead tab 120 during a charging/discharging operation may be discharged via the terminal portion 160 having a large heat capacity.

The protrusion 160$b$ may include a first groove portion 167 for electrical connection with a temperature sensor (not shown in FIGS. 1 and 2, but shown in various configurations in FIGS. 4-7 as discussed in detail below) for obtaining temperature information of the battery pack 10, and a second groove portion 168 that is coupled to a bus bar (not shown in FIGS. 1-6, but shown in FIG. 7 as discussed in detail below). The first groove portion 167 and the second groove portion 168 may be formed in an external surface of the protrusion 160$b$.

The temperature sensor may be attached to the terminal portion 160, and a signal of the temperature sensor may be transmitted to an external controller via a wire. The controller (not shown) may control the charging/discharging operation according to surface temperature of the battery pack 10 transmitted from the temperature sensor.

The temperature sensor may include, for example, a thermocouple. The temperature sensor may be any element through which temperature information of the battery pack 10 may be obtained, and thus the type of the temperature sensor is not specifically limited.

Hereinafter, coupling between a temperature sensor and a terminal portion 160 using a first groove portion 167 will be described in detail with reference to FIGS. 4 through 6, and an embodiment in which battery packs 10 are electrically coupled to one another by using a second groove portion 168 will be described with reference to FIG. 7.

Figure 4:
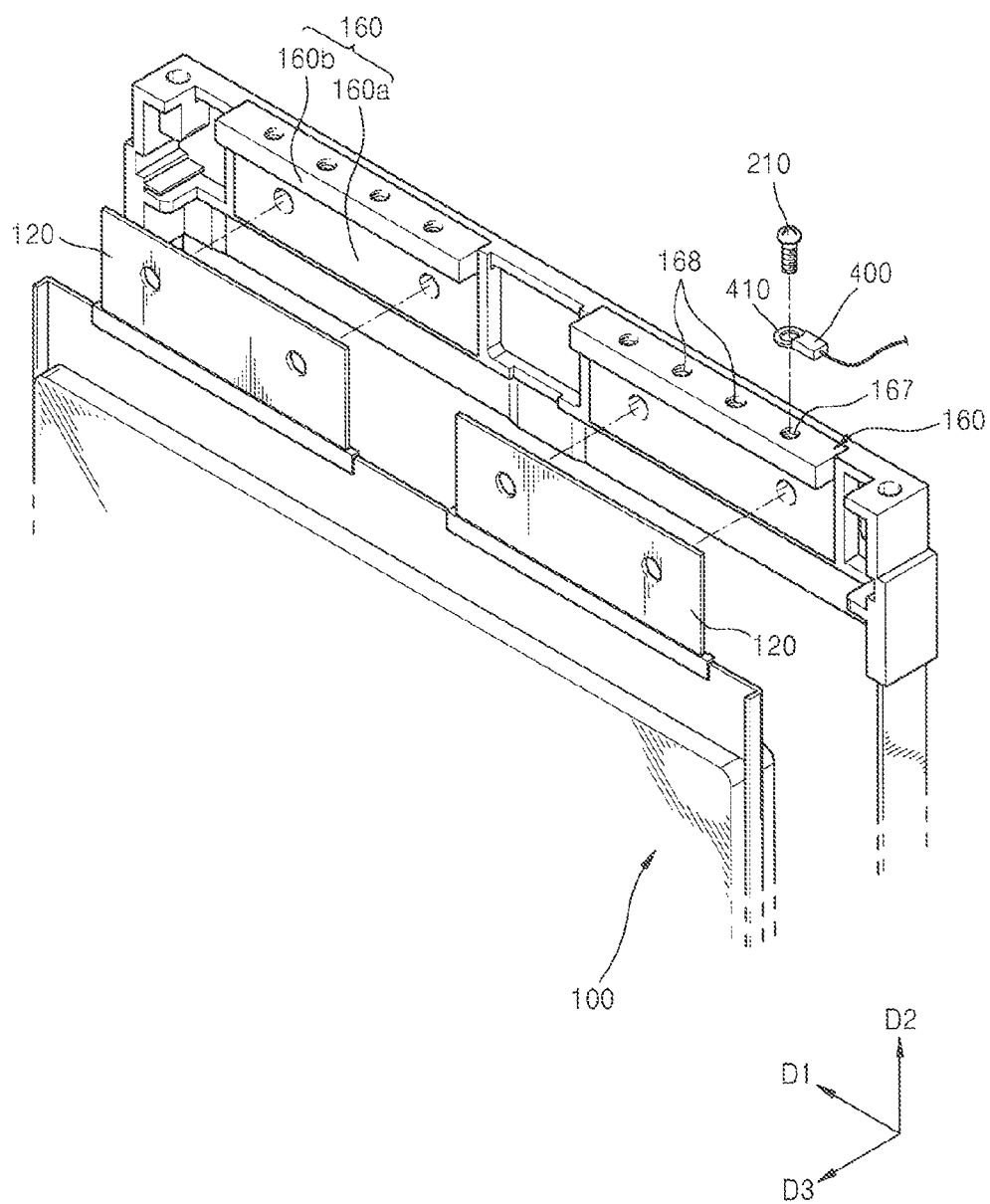
FIG. 4 illustrates a terminal portion of a battery pack and a temperature sensor in a coupled state, according to an embodiment of the present invention.

FIG. 4 illustrates a terminal portion 160 of a battery pack 100 and a temperature sensor 400 in a coupled state, according to an embodiment of the present invention.

Referring to FIG. 4, the terminal portion 160 may include a body portion 160$a$ and a protrusion 160$b$, and the body portion 160$a$ may have substantially the same surface area as a lead tab 120. The protrusion 160$b$ may protrude vertically with respect to the body portion 160$a$. The protrusion 160$b$ may protrude approximately in a vertical direction with respect to the body portion 160$a$ to prevent the lead tab 120 from being directly exposed to the outside.

The temperature sensor 400 may be attached on the protrusion 160$b$. For example, the temperature sensor 400 may be attached on the protrusion 160$b$ via mechanical coupling by using a bolt 210. To this end, the first groove portion 167 may be formed in the protrusion 160*b*, and the temperature sensor 400 may include a ring terminal 410.

The bolt 210 passes through the ring terminal 410 to be coupled to the first groove portion 167 so that the temperature sensor 400 is attached on the protrusion 160*b*. The first groove portion 167 may have a concave form toward an inner portion of the protrusion 160*b* so as to be mechanically coupled to the bolt 210, and a screw thread corresponding to an outer diameter of the bolt 210 may be formed in an inner surface of the first groove portion 167.

The first groove portion 167 may be formed on at least one of two sides of the protrusion 160*b* with respect to the second groove portion 168. Alternatively, the first groove portions 167 may be formed in the second groove portions 168, respectively. At least one of the first groove portions 167 and the temperature sensor 400 may be coupled to each other.

At least one second groove portion 168 may be formed on an outer surface of the protrusion 160*b*, and a bus bar (not shown in FIGS. 1-6, but shown in FIG. 7 as discussed in detail below) for electrically connecting the plurality of battery packs, may be coupled to the protrusion 160*b* using a bolt. A structure, in which a plurality of battery packs are electrically connected to one another by using the second groove portions 168, will be described in detail later with reference to FIG. 7.

Figure 5:
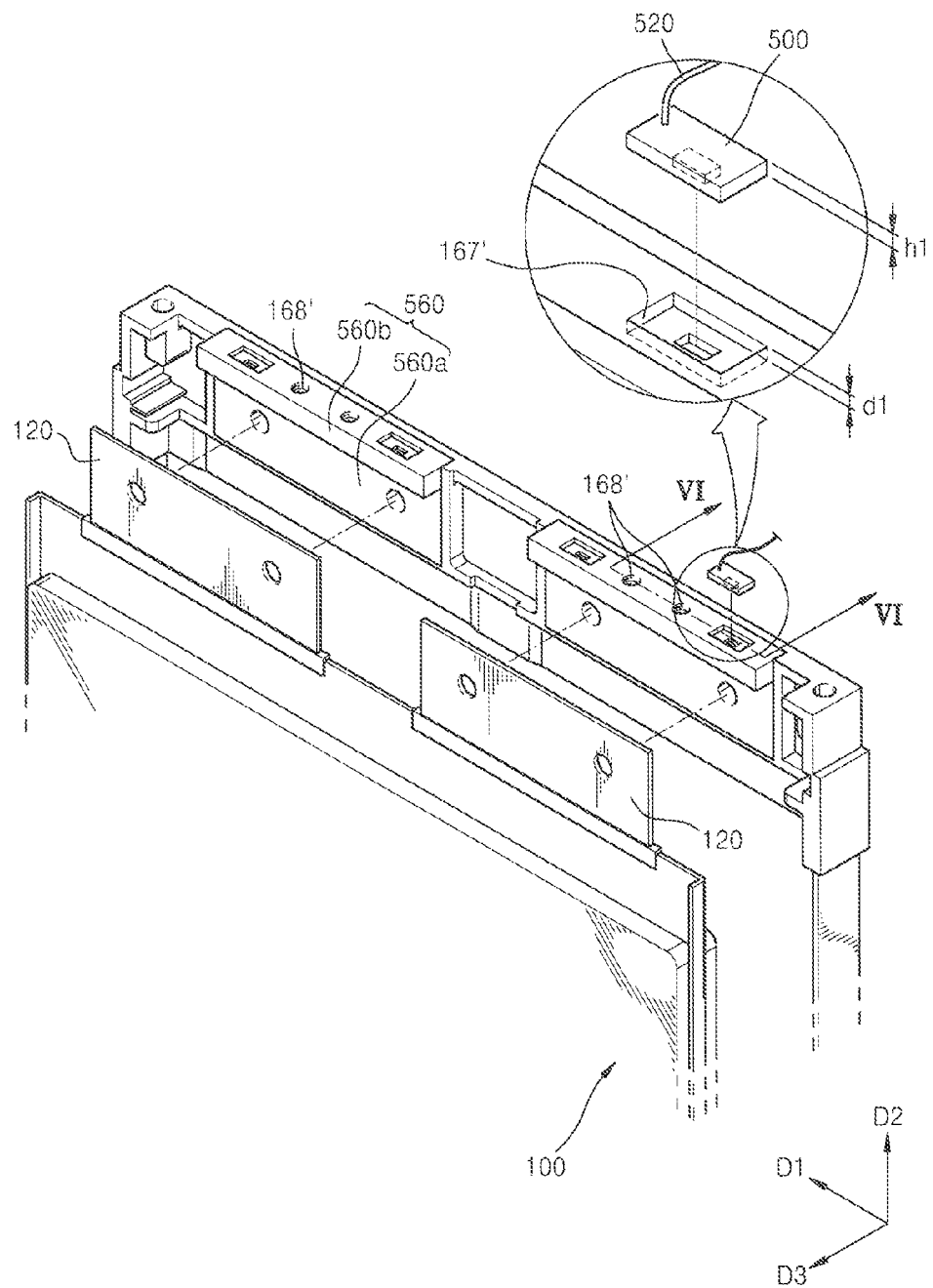
FIG. 5 illustrates a terminal portion of a battery pack and a temperature sensor in a coupled state, according to another embodiment of the present invention.

FIG. 5 illustrates a terminal portion 560 of a battery pack and a temperature sensor 500 in a coupled state, according to another embodiment of the present invention. FIG. 6 is a cross-sectional view taken along a line VI-VI of FIG. 5.

Figure 6:
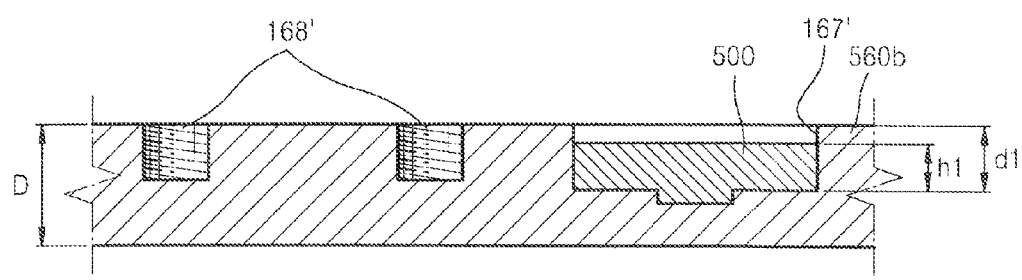
FIG. 6 is a cross-sectional view taken along a line VI-VI of FIG. 5.

Referring to FIGS. 5 and 6, a terminal portion 560 may include a body portion 560*a* and a protrusion 560*b*, and the body portion 560*a* may have substantially the same surface area as a lead tab 120 so as to be in surface contact with the lead tab 120. The protrusion 560*b* may protrude vertically with respect to the body portion 560*a* (in a direction D3).

The temperature sensor 500 may be embedded in a first groove portion 167' formed in the protrusion 560*b*. The first groove portion 167' may have an embedding space that is substantially the same size as the temperature sensor 500, and a depth d1 of the embedding space may be greater than or equal to a height h1 of the temperature sensor 500 and may be smaller than a thickness D of the protrusion 560*b*. Temperature information of the battery cell 100, which is detected by using the temperature sensor 500 embedded in the first groove portion 167', may be transmitted to a controller (not shown) of a battery cell via a cable 520.

The first groove portion 167' may also be formed on at least one of two sides of the it protrusion 560*b* with respect to a second groove portion 168'. Alternatively, the first groove portions 167' may be formed on two sides of the second groove portion 168', respectively, so that the temperature sensor 500 may be embedded at a position of at least one of the plurality of the first groove portions 167'.

Figure 7:
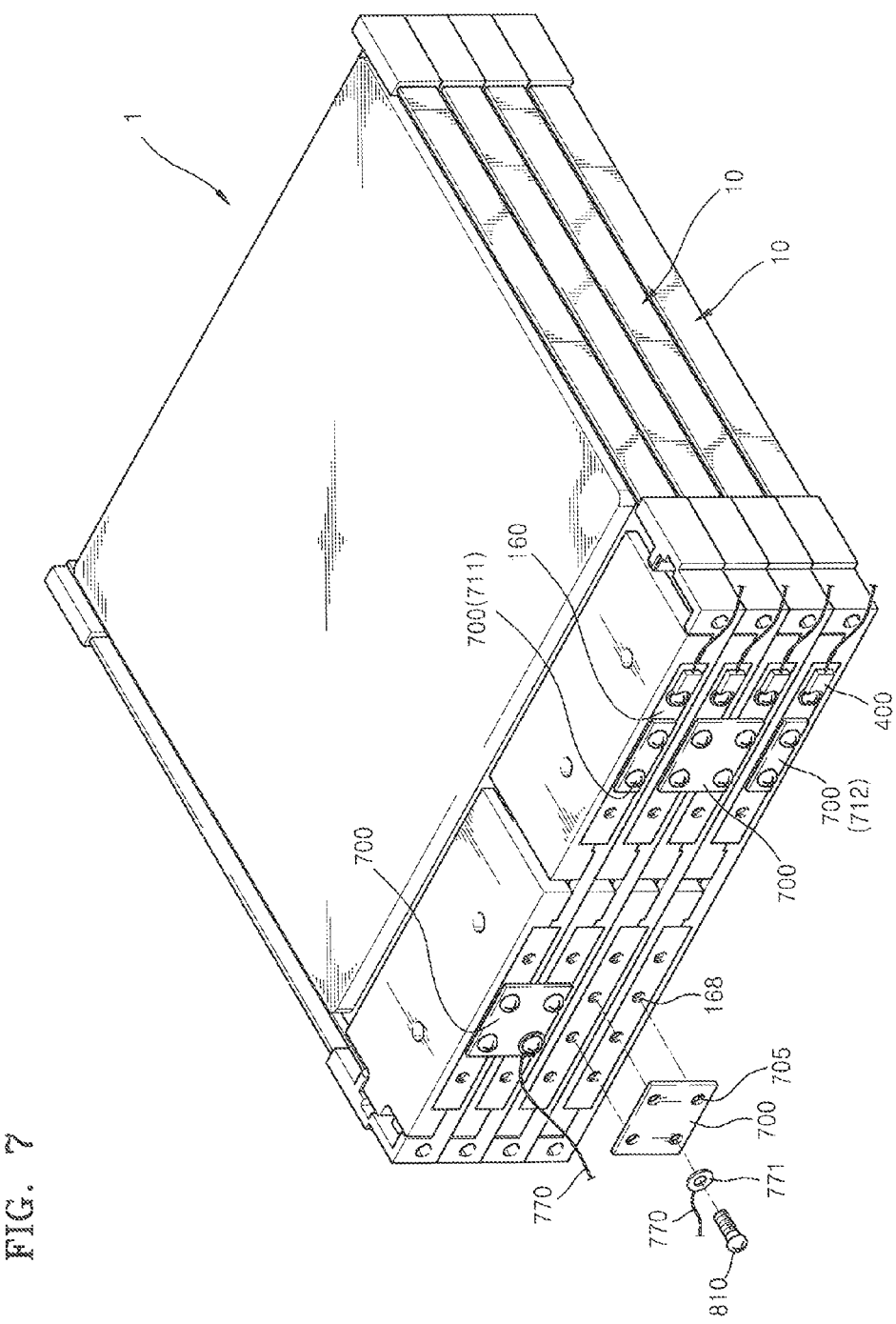
FIG. 7 illustrates a battery module according to an embodiment of the present invention.

FIG. 7 illustrates a battery module 1 according to an embodiment of the present invention.

Referring to FIG. 7, the battery module 1 may include a plurality of battery packs 10 that are stacked along a thickness direction D3, and the battery packs 10 may be electrically connected to one another via a plurality of bus bars 700. The battery packs 10 illustrated in FIG. 7 have the same structure as the battery pack 10 described with reference to FIGS. 1 through 3, and temperature information of each of the battery packs 10 may be obtained via the temperature sensor 400 described with reference to FIG. 4 above, and thus descriptions thereof will not be provided here.

Hereinafter, each of the battery packs 10 will be counted as an assembly unit and the description will focus on coupling in the battery module 1 whereby a plurality of the battery packs 10 are electrically coupled to one another.

The plurality of battery packs 10 may be electrically connected to one another via the bus bars 700. For example, the bus bars 700 may be coupled to terminal portions 160 of adjacent battery packs 10, thereby electrically connecting the adjacent battery packs 10 to one another. The bus bars 700 may include a metal having good electrical conductivity such as nickel, copper, or aluminum.

Each bus bar 700 may have an approximately square shape and may be coupled to the terminal portion 160 via a bolt 810. For example, the bolt 810 may pass through a coupling hole 705 formed in each bus bar 700 to be coupled to a second groove portion 168 formed in the terminal portion 160 so that the bus bar 700 and the terminal portion 160 may be coupled to each other. The second groove portion 168 may have a concave form toward an inner portion of the terminal portion 160 so as to be mechanically coupled to the bolt 810, and a screw thread corresponding to an outer diameter of the bolt 710 may be formed in an inner surface of the second groove portion 168.

In order to increase a coupling force between the bus bars 700 and the battery packs 10, a plurality of second groove portions 168 may be formed.

One of the bus bars 700 may function as a positive electrode terminal 711 of the battery module 1, and another bus bar 700 may function as a negative electrode terminal 712 of the battery module 1. That is, a plurality of battery packs 10 that are electrically connected to one another via the bus bars 700 form one battery module 1, and the one battery module 1 may include the positive electrode terminal 711 and the negative electrode terminal 712.

A balancing cable 770 may be included to obtain balancing information of the battery module 1. For example, the balancing cable 770 may be coupled to the bus bars 700. To this end, the balancing cable 770 may include a ring terminal 771. When the bolt 810 passes through a through hole 705 of the bus bars 700 to be coupled to the second groove portion 168, the bolt 810 also passes through the ring terminal 771 of the balancing cable 770 so that the balancing cable 770 may also be coupled to the bus bar 700.

Information for performing voltage balancing of the battery module 1 may be transmitted to the controller (not shown) via the balancing cable 770. For example, in order to perform voltage balancing, a current value of the battery module 1 may be transmitted to the controller via the balancing cable 770.

As described above with reference to FIG. 4, the temperature sensor 400 may be attached on an outer surface of the terminal portion 160 in the battery pack 10. The lead tabs of a battery cell may have the highest temperature among the batter cell because the terminal portion 160 directly contacts a lead tab of a battery cell of a highest temperature, and thus an accurate temperature value of the battery pack 10 that is necessary to control charging or discharging may be obtained.

The temperature sensor 400 may be coupled to at least one of the plurality of first groove portions 167 considering the arrangement of the battery module 1 and coupling positions of other members. Since one temperature sensor 400 is disposed in an outer portion of one battery pack 10, the temperature sensor 400 may be easily attached. In addition, effects due to other battery packs 10, which are not to be measured by the temperature sensor 400, for example, other battery packs 10 adjacent to a battery pack that is to be measured by the temperature sensor 400, may also be minimized.

While the battery module 1 illustrated in FIG. 7 includes four battery packs 10, the number of battery packs 10 of the battery module 1 is not limited thereto. Also, while the temperature sensor 400 is attached to the terminal portion 160 by using a bolt in the current embodiment of the present invention, the temperature sensor 400 according to the current embodiment of the present invention may also be attached to the terminal portion 160 in the manner described above with reference to FIG. 5.

According to the embodiments of the present invention, a temperature sensor may be easily attached to a battery pack via mechanical coupling such as bolt coupling or embedding.

In addition, accurate temperature information may be obtained by attaching a temperature sensor on a terminal portion that directly contacts a lead terminal having the highest temperature among battery cells. Also, interference due to battery packs that are not to be measured using a corresponding temperature sensor, for example, battery packs that are adjacent to a battery pack which is to be measured by using the temperature sensor, may be minimized.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack, comprising:
a battery cell; and
a case accommodating the battery cell and comprising a terminal portion that is electrically connected to the battery cell,
the terminal portion comprising a first groove portion accommodating attachment of a temperature sensor providing temperature information of the battery cell and a second groove portion accommodating coupling of a bus bar,
wherein the first groove portion has a concave shape to accommodate a bolt or screw.

2. The battery pack of claim 1, wherein the temperature sensor is coupled to the first groove portion via a threaded fastener.

3. A battery pack, comprising:
a battery cell; and
a case accommodating the battery cell and comprising a terminal portion that is electrically connected to the battery cell,
the terminal portion comprising a first groove portion accommodating attachment of a temperature sensor providing temperature information of the battery cell and a second groove portion accommodating coupling of a bus bar, wherein:
the temperature sensor comprises a ring terminal,
the temperature sensor is coupled to the first groove portion via a threaded fastener, and
the temperature sensor and the first groove portion are coupled to each other by the threaded fastener passing through the ring terminal to be coupled to the first groove.

4. The battery pack of claim 3, wherein a screw thread corresponding to the threaded fastener is formed in an inner surface of the first groove portion.

5. The battery pack of claim 1, wherein the first groove portion comprises an embedding space in which the temperature sensor is embedded.

6. A battery pack, comprising:
a battery cell; and
a case accommodating the battery cell and comprising a terminal portion that is electrically connected to the battery cell,
the terminal portion comprising a first groove portion accommodating attachment of a temperature sensor providing temperature information of the battery cell and a second groove portion accommodating coupling of a bus bar,
wherein a screw thread for a threaded fastener is formed in an inner surface of the second groove portion.

7. The battery pack of claim 1, wherein the first groove portion is formed on one side or both sides of the terminal portion with respect to the second groove portion.

8. The battery pack of claim 1, wherein the terminal portion comprises:
a body portion contacting lead tabs extended from the battery cell; and
a protrusion that is vertically extended from a side of the body portion and that comprises the first groove portion.

9. A battery module comprising a plurality of battery packs stacked in a thickness direction,
wherein each battery pack of the plurality of battery packs, comprises:
a battery cell comprising a lead tab extended in one direction;
a case accommodating the battery cell and comprising, a terminal portion that is electrically connected to the lead tab; and
a plurality of bus bars that electrically connect the battery packs,
wherein a first groove portion for disposing a temperature sensor for obtaining temperature information of the battery cell and a second groove portion for coupling a bus bar are formed on an outer portion of the terminal portion,
wherein the first groove portion has a concave shape to accommodate a bolt or screw.

10. A battery module comprising a plurality of battery packs stacked in a thickness direction, wherein each battery pack of the plurality of battery packs, comprises:
a battery cell comprising a lead tab extended in one direction;
a case accommodating the battery cell and comprising a terminal portion that is electrically connected to the lead tab; and
a plurality of bus bars that electrically connect the battery packs,
wherein a first groove portion for disposing a temperature sensor for obtaining temperature information of the battery cell and a second groove portion for coupling a bus bar are formed on an outer portion of the terminal portion,
wherein the temperature sensor comprises a ring terminal, and the temperature sensor is disposed on the terminal portion via a threaded fastener that passes through the ring terminal to be coupled to the first groove portion.

11. The battery module of claim 9, wherein the first groove portion comprises an embedding space in which the temperature sensor is to be embedded.

12. The battery module of claim 11, wherein the embedding space is formed at a depth equal to or higher than a height of the temperature sensor.

13. The battery module of claim 9, wherein the terminal portion comprises:
a body portion contacting the lead tabs; and a protrusion portion that is vertically extended from a side of the body portion and comprises the first groove portion formed on an outer surface of the protrusion.

14. The battery module of claim 9, wherein the first groove portion is formed on one side or both sides of the protrusion with respect to the bus bar.

15. The battery module of claim 9, wherein at least some of the plurality of bus bars further comprise a balancing cable for obtaining, state information of the battery packs for voltage balancing of the battery module.

16. A battery module having a plurality of battery packs in which said plurality of battery packs are stacked one immediately upon another, comprising:
- a battery cell having a lead tab extending from the battery cell;
- a case accommodating the battery cell;
- a terminal portion embedded in an end of the case and electrically connected to the lead tab;
- a first groove embedded in an outer end of the terminal portion;
- a second groove embedded in the outer end of the terminal portion;
- at least one bus bar connected to the terminal portion via the second groove, said at least one bus bar electrically connecting the plurality of battery packs one to another; and
- a temperature sensor obtaining temperature information of the battery cell connected to the terminal portion via the first groove,
- wherein the first groove portion has a concave shape to accommodate a bolt or screw.

17. A battery module having a plurality of battery packs in which said plurality of battery packs are stacked one immediately upon another, comprising:
- a battery cell having a lead tab extending from the battery cell;
- a case accommodating the battery cell;
- a terminal portion embedded in an end of the case and electrically connected to the lead tab;
- a first groove embedded in an outer end of the terminal portion;
- a second groove embedded in the outer end of the terminal portion;
- at least one bus bar connected to the terminal portion via the second groove, said at least one bus bar electrically connecting the plurality of battery packs one to another; and
- a temperature sensor obtaining temperature information of the battery cell connected to the terminal portion via the first groove,
- wherein the temperature sensor comprises a ring terminal, said temperature sensor is disposed on the terminal portion via a bolt or screw that passes through the ring terminal coupling the temperature sensor to the first groove portion.

18. The battery module recited in claim 16, wherein the first groove portion is an indentation in the terminal portion which entirely contains the temperature sensor.

19. The battery module recited in claim 18, wherein the first groove and the temperature sensor have a corresponding rectangular shape.

20. The battery module recited in claim 19, wherein a depth of the first groove exceeds the thickness of the temperature sensor.

* * * * *